(12) United States Patent
Mullins et al.

(10) Patent No.: US 11,935,065 B2
(45) Date of Patent: Mar. 19, 2024

(54) SYSTEMS AND METHODS FOR IMPLEMENTING OFFLINE PROTOCOL IN CBDC NETWORKS USING COLLATERAL CHAIN

(71) Applicant: Fluency Group Ltd., London (GB)

(72) Inventors: Inga Mullins, London (GB); Pawel Brataniec, London (GB); Kamil Jamroz, London (GB)

(73) Assignee: FLUENCY GROUP LTD., London (GB)

(*) Notice: Subject to any disclaimer, the term of this patent is extended or adjusted under 35 U.S.C. 154(b) by 194 days.

(21) Appl. No.: 17/470,571

(22) Filed: Sep. 9, 2021

(65) Prior Publication Data
US 2023/0075202 A1    Mar. 9, 2023

(51) Int. Cl.
| | | |
|---|---|---|
| G06Q 20/00 | (2012.01) | |
| G06Q 20/38 | (2012.01) | |
| G06Q 20/40 | (2012.01) | |
| G06Q 40/02 | (2023.01) | |
| H04L 9/32 | (2006.01) | |
| G06Q 20/36 | (2012.01) | |

(52) U.S. Cl.
CPC ..... *G06Q 20/4033* (2013.01); *G06Q 20/3825* (2013.01); *G06Q 20/4014* (2013.01); *G06Q 20/405* (2013.01); *G06Q 40/02* (2013.01); *H04L 9/3247* (2013.01); *G06Q 20/367* (2013.01); *G06Q 20/3829* (2013.01); *G06Q 20/389* (2013.01)

(58) Field of Classification Search
CPC ........... G06Q 20/4033; G06Q 20/3825; G06Q 20/4014; G06Q 20/405; G06Q 40/02; G06Q 20/367; G06Q 20/3829; G06Q 20/389; G06Q 20/02; G06Q 20/10; G06Q 20/4037; H04L 9/3247; H04L 2209/56; H04L 9/50
See application file for complete search history.

(56) References Cited

U.S. PATENT DOCUMENTS

| | | | |
|---|---|---|---|
| 2018/0365688 A1 | 12/2018 | He et al. | |
| 2019/0347659 A1* | 11/2019 | Hudson | ............... G06Q 20/108 |
| 2021/0192509 A1 | 6/2021 | Eskandarian et al. | |

FOREIGN PATENT DOCUMENTS

WO    2021008453 A1    1/2021

OTHER PUBLICATIONS

Extended European Search Report; Application No. 21195860.8; Completed: Feb. 17, 2022; dated Feb. 25, 2022; 10 Pages.
Machine Translation of WO2021008453.

* cited by examiner

*Primary Examiner* — Dante Ravetti
(74) *Attorney, Agent, or Firm* — Husch Blackwell LLP

(57) ABSTRACT

The invention provides techniques for enabling offline devices that do not have an active connection to an account-based CBDC network to participate in CBDC network processes such as asset transfers. This is enabled by defining an offline protocol that governs the handling of such processes in an offline state. A collateral chain is provided by the CBDC network that links together multiple accounts so that an account lower down in the collateral chain can be used to settle a transaction in the case where an account higher up the chain does not hold sufficient CBDC to settle the transaction. On the device side, offline transaction messages are exchanged that enable either device to commit the transaction to the CBDC network once the device obtains an active connection to the CBDC network.

3 Claims, 11 Drawing Sheets

SYSTEMS AND METHODS FOR IMPLEMENTING OFFLINE PROTOCOL IN CBDC NETWORKS USING COLLATERAL CHAIN

TECHNICAL FIELD

The present invention relates to Central Bank Digital Currency (CBDC) distributed networks. More particularly, the present invention relates to methods and systems for enabling devices that do not have an active connection to a CBDC network to carry out transactions for transferring an asset such as a Central Bank Digital Currency (CBDC) using the CBDC network, or implementing a financial product.

BACKGROUND

Multiple sources list different characteristics that a CBDC platform should have. One of the most important is for the CBDC platform to help drive financial inclusion on a large scale—i.e. to build a system in such a way it can be easily used by whoever and wherever, regardless of their understanding of underlying technology and/or complexity of the electronic device(s) they have or may need to have.

In practice, theoretical inclusion of a hundred percent is impossible to achieve, but the point is to bring that number as high as possible, almost a hundred percent, and ideally to improve that value in comparison to non-CBDC finance platforms. In order to do that, a CBDC platform needs to support various specific features and follow certain guidelines, which would allow it to reach that high-degree of inclusivity. For common financial IT systems that usually translates to having low hardware requirements on devices used to interact with the system; easy to understand and simple clients in terms of UI/UX with support for different functionalities, having special modes of operating for people with disabilities and so on. Most of those apply to CBDC as well, but they are not going to be discussed further here, as they are already well-defined and known issues. This specification will rather focus on a different part of inclusivity, namely the requirement of the end-user having to be connected to the CBDC network in the first place—e.g. via the internet or a different kind of network.

End-user having to be connected to the network is a part of the problem on CBDC inclusivity as it creates an arbitrary constraint on the system usage, limited to the scope of network providers' reach, which ultimately disqualifies the system to be used in more remote or rural areas that are outside of that reach. A CBDC cannot be limited in such a way and needs to provide a solution to be used seamlessly everywhere, without invoking any kind of doubt in the end-user that they may not be able to use it outside of major agglomerations, abroad or any other particular place. From a technical standpoint it means that that specific system needs to provide support for interacting with it indirectly at some scale without compromising the security of the solution in the first place. The difficulty in doing so comes from the fact that interaction in such a case means change of data—and yet—to change that data, it needs to be known, validated and proven in the first place, ahead of the trigger, which is hard to have while not being connected to it. To put it simply, this case requires creation of a dedicated protocol to be added, and such a protocol that is tailored to suit the needs of a CBDC network does not exist in the art.

The data being stored in a CBDC system refers to transactional data that keeps track of distribution of assets, including, but not limited to, digital national currencies. That data does not only contain the current state, but is also able to provide information on all historical states to determine how funds were transferred and between who. The end-users in that setup are identified by unique identifiers, usually, derived from some cryptographic function.

In existing distributed networks assets and their amounts can be implemented in any way that suits the platform, but most of the time is done either as tokens (Unspent Transaction Output, 'UTXO'-based) or using smart contracts (account-based). Interacting with the system can be performed in two ways: a) writing information into the system that changes current state or b) reading information from the system for either current state or a past one. Those two methods can be understood as "online" methods, as in order to do any of them, a connection for the CBDC system needs to be maintained.

The most popular known online methods are account-based and token-based (UTXO) ones. The biggest difference between those two is that an account-based approach is implemented in a form of a decentralized key=>value registry having information on each users assets, while the token-based technique bases its model on usage of so-called unspent transaction outputs, which are consumed and recreated on each transaction. The account-based technique is more similar to accounting used in the currently working banking system, while the token-based technique is more similar to having physical bank notes in one's wallet.

An "offline" method, on the other hand, should be able to save a valid online trigger for writing outside of the network, and provide options to pass it around with guarantee to be able to eventually settle it "online". To be precise, an offline protocol for a CBDC system desirably is able to: a) create a message containing a valid trigger for writing data to the system b) transfer the message between parties without any connection to the network; c) guarantee that the message can be unwrapped and transformed into valid online trigger that can be settled at anytime in the future; and d) guarantee that the message is secure to be received without having access to the latest state of the system.

However, such a protocol does not currently exist. Known protocols are suitable only for online use, i.e. where an active connection to the CBDC network exists. There is therefore a need for an offline protocol that desirably provides at least one of a) to d) in the immediately preceding paragraph.

SUMMARY OF THE INVENTION

The invention provides techniques for enabling offline devices that do not have an active connection to an account-based CBDC network to participate in CBDC network processes such as asset transfers. This is enabled by defining an offline protocol that governs the handling of such processes in an offline state. A collateral chain is provided by the CBDC network that links together multiple accounts so that an account lower down in the collateral chain can be used to settle a transaction in the case where an account higher up the chain does not hold sufficient CBDC to settle the transaction. On the device side, offline transaction messages are exchanged that enable either device to commit the transaction to the CBDC network once the device obtains an active connection to the CBDc network.

In a first aspect the invention provides a computer-implemented method for authorising an offline transaction made via a distributed Central Bank Digital Currency, CBDC, network between a payor device and a payee device, wherein at least one of the payor device and the payee device did not have an active connection to the CBDC network at the time the offline transaction was performed, wherein the CBDC network is an account-based CBDC network in which each user of the network has an associated user account, the payor device and the payee device being respectively associated with a payor user account and a payee user account, the method comprising: a) receiving, by a node of the CBDC network, an offline transaction message relating to the offline transaction; b) processing, by the node, the offline transaction message using an asset smart contract of the CBDC network to calculate a transaction state change; c) authorising, by the node, the transaction state change using an authorisation smart contract of the CBDC network, the authorising comprising: determining whether the payor user account holds a sufficient amount of a Central Bank Digital Currency, CBDC, asset to fund the transaction; in the case where the payor user account does hold a sufficient amount of the CBDC asset to fund the transaction, authorising the transaction; in the case where the payor user account does not hold a sufficient amount of the CBDC asset to fund the transaction, identifying, using the authorisation smart contract, a collateral user account that is linked to the payor user account such that a transaction specifying the payor user account as payor can be funded using a CBDC asset supplied from the collateral user account in the case where the payor user account is unable to fund the transaction; and repeating steps b) and c) using the collateral user account in place of the payor user account.

In a second aspect the invention provides a computer-implemented method for performing an offline transaction via a distributed Central Bank Digital Currency, CBDC, network between a payor device and a payee device, wherein at least one of the payor device and the payee device does not have an active connection to the CBDC network at the time the offline transaction is performed, wherein the CBDC network is an account-based CBDC network in which each user of the network has an associated user account, the payor device and the payee device being respectively associated with a payor user account and a payee user account, the method comprising: receiving, by the payee device, an offline transaction message comprising: offline transaction details including a transaction account settlement level, and metadata relating to the payor user account that is cryptographically signed by an issuer of the payor user account, the metadata including a payor account settlement level; calculating, by the payee device, a transaction account settlement level based on the offline transaction details and/or metadata; determining, by the payee device, whether the payor account settlement level is greater than or equal to the transaction account settlement level; in the negative, declining the transaction by the payee device; and in the affirmative, accepting the transaction and storing the offline transaction message by the payee device.

In a third aspect the invention provides a computer-implemented method for performing an offline transaction via a distributed Central Bank Digital Currency, CBDC, network between a payor device and a payee device, wherein at least one of the payor device and the payee device does not have an active connection to the CBDC network at the time the offline transaction is performed, wherein the CBDC network is an account-based CBDC network in which each user of the network has an associated user account, the payor device and the payee device being respectively associated with a payor user account and a payee user account, the method comprising: generating, by the payor device, an offline transaction message comprising: offline transaction details and metadata relating to the payor user account that is cryptographically signed by an issuer of the payor user account, the metadata including a payor account settlement level; and transmitting, by the payor device, the offline transaction message to the payee device.

Further preferred features of the invention are set out in the appended dependent claims.

BRIEF DESCRIPTION OF THE DRAWINGS

The invention is described, by way of example only, with reference to the following drawings in which.

DETAILED DESCRIPTION

Figure 1:
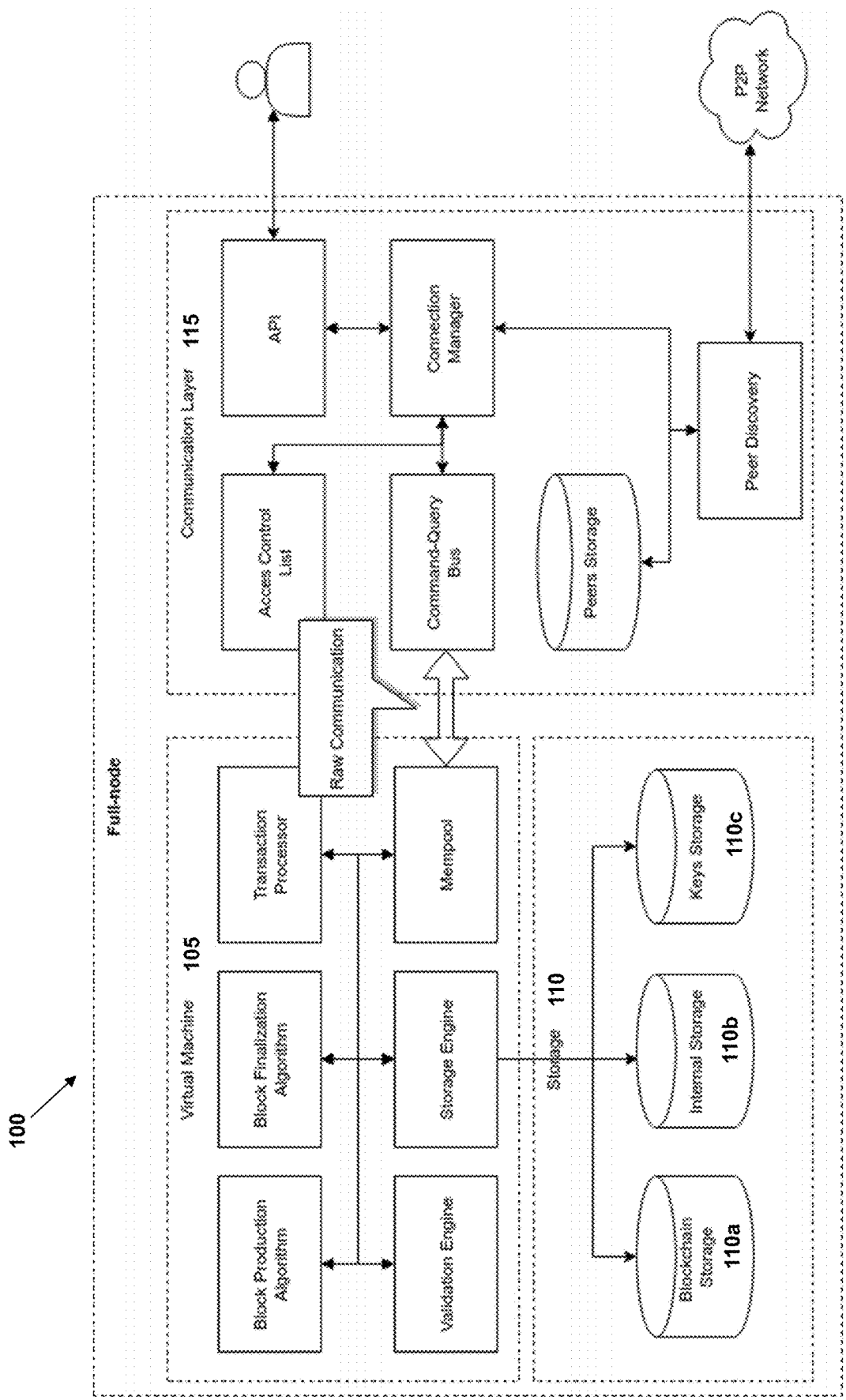
FIG. 1 is a schematic drawing of a node of a CBDC network that is capable of implementing embodiments of the invention.

As used herein the following terms have the meanings indicated below:

A 'distributed network' is understood to refer to a network having distributed components ('nodes') that are distinct from one another, e.g. each node can be a distinct computer. Nodes within the network can be geographically distributed, e.g. potentially located all over the world. The distributed network can function as a shared ledger that operates on shared ledger principles as are known per se in the art (e.g. blockchain or Directed Acyclic Graphs).

A 'Central Bank Digital Currency' (CBDC) is understood to refer to an electronic representation of a traditional fiat currency. A CBDC is issued by an appropriate issuing authority referred to as a Central Bank that is capable of issuing currency on behalf of a nation, state, region, or other such entity. An example of a Central Bank is the European Central Bank for the EU region. The term 'digital national currency' may be used interchangeably with CBDC and also the term 'CBDC asset'.

A 'CBDC network' is understood to refer to a distributed network that facilitates operations with a CBDC, primarily transactions between users of the CBDC network, e.g.

transactions between merchants and private individuals, or between pairs of private individuals. However, the invention is not limited to financial transactions on a CBDC as other operations such as financial products can also be provided by a CBDC network operating in accordance with the invention. The invention particularly finds utility in an account-based CBDC in which users of the CBDC network each have an account that identifies them uniquely, e.g. by linking them to a cryptographic key pair (typically with the public key serving as an address for the user account). A CBDC network can transfer CBDC between users, but is not limited to this and other electronic assets can also be transferred or otherwise operated on in a CBDC network.

A CBDC network according to the invention can operate according to any currently known or future developed distributed ledger techniques, e.g. blockchain. The CBDC network enables handling of 'assets' such as CBDC and related financial products. The "handling of" assets is to specifically be understood as including any one or more of the execution, recording, verification, validation and all post enrolment activities related to the assets and their subset elements.

A 'smart contract' is understood to refer to a contract that is written in computer code. The smart contract code can be executed to produce a result, e.g. a smart contract may enable one user to transfer funds to another user in a CBDC network. Smart contracts per se are known in the art and so a detailed description of smart contracts is not provided here in the interests of brevity. The term 'smart contract' is understood to include an on-chain smart contract that is deployed on the distributed ledger itself (e.g. a blockchain smart contract), an off-chain smart contract or an external module with the functionality of a smart contract. The external module could be either software or hardware based.

An 'active' network connection is understood to mean a network connection that is usable to send and receive data between two end-points. The end-points could be, for example, a user device and a node computer or gateway computer of a CBDC network. An active network connection can be facilitated by any known or future developed means, for example a connection over the internet, via a cellular network or a combination of the two.

The term 'offline' in this specification refers to a state in which there is no active connection to a CBDC network. A device is therefore considered to be offline if it does not have an active connection to the CBDC network, i.e. it does not have a direct or indirect connection to the CBDC network. The term offline does not preclude the device having other network connections that enable data to be transmitted and/or received to devices that are not part of the CBDC network, e.g. a connection to another device such as a Bluetooth®, NFC, infra-red, WiFi connection and the like, or the reading of information on a display of the device (e.g. scanning a QR code displayed on the display of a first device using a camera of a second device). A connection of this type that does not enable communication with the CBDC network may be referred to herein as a 'local connection', a 'local communication channel', or a 'peer-to-peer' communication channel. It is therefore understood that an offline message is a message that is able to facilitate CBDC processes such as asset transfer without contacting the CBDC network.

The term 'online' in this specification is understood to refer to a state in which there is an active connection to a CBDC network. A device is therefore considered to be online if it does have an active connection to the CBDC network. It will be appreciated that a device can be offline at a first time and online at a second, later time. A real world example of this is a mobile device such as a mobile phone moving from an area with no cellular signal coverage such as an underground station to an area with cellular signal coverage.

A 'device', or equivalently 'computer', is understood to refer to an electronic piece of equipment that is capable of processing digital data. Examples include: a mobile phone, a tablet, a laptop computer, a desktop computer, a gaming console, a smart TV, a cloud computing resource, and the like. Such devices typically include a processor, a memory and a network interface capable of transmitting and receiving data from an external end-point (e.g. another such device or a component of a CBDC network). Virtual machines are included within the scope of a 'device' or 'computer'. A user device is such a device that is owned, or otherwise in the control of, a particular user.

A 'user' is understood to be an entity that participates in CBDC network processes using a device or computer, e.g. a private individual, a company, a central bank or other such financial institution, a merchant and an issuer. A user has an associated CBDC user account (hereafter 'user account') that enables the user to interact with the CBDC network. Typically a user account has an associated address, perhaps associated with a private key of the user account, the address enabling the user account to be uniquely identified by the CBDC network. The address is typically a string of characters, e.g. 34, 40 or 42 characters. A user can access their user account via a device, e.g. via software installed or otherwise accessible to said device.

A 'node' is understood to be a component of the CBDC network that performs distributed ledger functions, e.g. participating in consensus. A node is typically implemented by a cloud-based computing resource, but the invention is not restricted to this. A CBDC network is formed of two or more such nodes. Each node may implement a virtual machine, e.g. the Ethereum Virtual Machine or a variant thereof, to execute CBDC network processes.

This detailed description is split into two parts. The first part describes the so-called 'offline protocol' that enables the invention to implement offline transactions in a CBDC network. The second part describes novel cryptographic techniques that can be used to support the offline protocol.

Offline Protocol

Broadly speaking the invention utilizes a mix of a) smart contracting capability of the CBDC platform itself and b) specially-crafted cryptographic function(s) as a means for implementing an offline protocol on top of a decentralized CBDC platform. Those two tools could be used together in order to secure the offline part of the system on both ends, meaning a) settlement of the data to be written and b) passing that data between parties directly when being offline. That mix may be referred to as "offline protocol" herein.

The offline protocol described herein can allow safe execution of writing data to the CBDC network (i.e., transactions) regardless of the state the CBDC network was in when the trigger was first issued (the offline transaction generated) and regardless of the state the CBDC network is in during the settlement (result). This is achieved by modeling transactions in a manner that allows creation of a transactional model focusing on state change and by specifying the change itself instead of specifying the result associated with change.

The invention finds particular utility in connection with decentralized CBDCs that a) utilize some kind of shared ledger (e.g. blockchain), b) utilize an account-based accounting model on top of previously mentioned ledger and c) support smart contracts. This CBDC network is typically maintained by two or more nodes that are used to 1) validate the data in the network by taking part in consensus 2) store and replicate the current state of the network, and past states—e.g. blockchain entries—to other network participants. The node structure, to which this setup fits, is presented in detail in [FIG. 1].

Referring to [FIG. 1], a typical setup of a node 100 ('full-node') suitable for implementing the invention is shown. Node 100 includes a virtual machine 105 that comprises a set of known components as shown in [FIG. 1]. Virtual machine 105 is known per se in the art and therefore is not described in detail here as the details of virtual machine 105 are not important in the operation of the invention. It suffices to say here that virtual machine 105 can take any known or future developed form, e.g. the Ethereum Virtual Machine or a derivative thereof.

Virtual machine 105 is in communication with storage 110 that includes blockchain storage 110a, internal storage 110b and keys storage 110c. Virtual machine 105 is also in communication with a communication layer 115 that comprises a set of known components as shown in [FIG. 1]. Storage 110a and communication layer 115 are both known per se in the art and therefore neither are described in detail here as the details of these components are not important in the operation of the invention.

The CBDC network that node 100 is a part of is an account-based CBDC network. This means that the state of each end-user account is stored in a decentralized registry, e.g. in the form of key=>value storage. This is shown schematically in [FIG. 2]. This structure allows a user holding an asset such as CBDC to deduct this from their own account and add it to an account of another user. This structure also allows a transactional model to be created in which the transaction represents state change itself and not state-change result. This is shown in [FIG. 2] where a state N of a set of accounts A to D is shown as element 200 and a state N+1 of the set of accounts A to D is shown as element 205. A transaction 210 moves the state from state N to state N+1 as shown in [FIG. 2].

Specifically, transaction 210 includes a payor user account identifier (Account D) and a payee user account identifier (Account A), as well as a value specifying an amount of an asset (in this case a CBDC asset) that is to be transferred. In this example transaction 210 also includes a transaction reference, in this case stored as a byte array, and a transaction signature, also stored in this example as a byte array. The transaction reference and transaction signature are each strings of characters in this example. Transaction 210 is purely exemplary and it will be appreciated that other forms of transaction 210 are also possible. For example, the transaction reference can be omitted and/or any other kind of data that the skilled person deems appropriate given the specifics of a particular implementation can be included in transaction 210.

Figure 2:
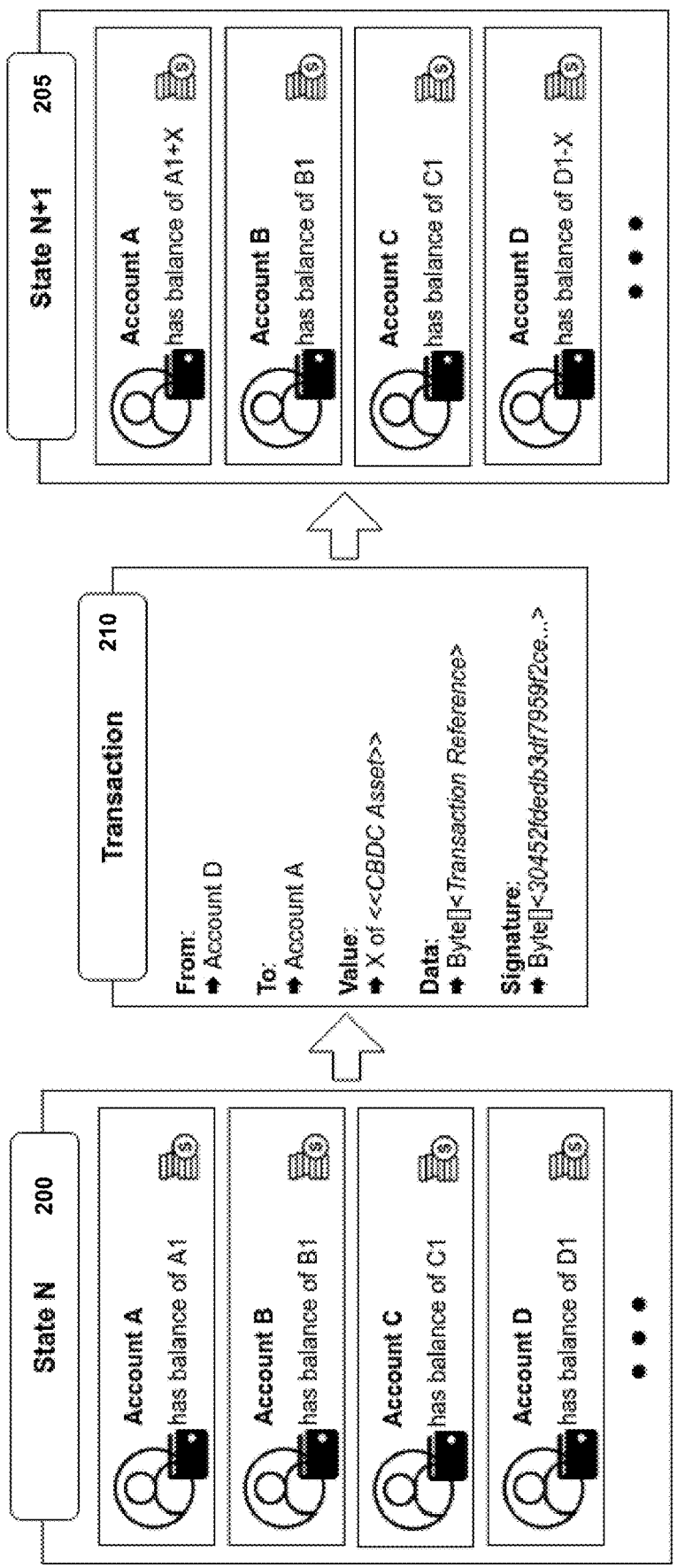
FIG. 2 is a schematic illustration of an account-based CBDC network state.

Transaction 210 can be implemented in the form of a transaction message, i.e. an electronic data structure containing certain data such as the data shown in [FIG. 2].

As can be seen in [FIG. 2], transaction 210 deducts X of a CBDC asset from the balance D1 of Account D and adds X of the CBDC asset to the balance A1 of Account A. The result is the state N+1 shown as element 205 in [FIG. 2].

The account-based transaction system of [FIG. 2] is able to provide at least three major features desirable for offline-protocol: a) having transactions not depend on each other or on a ledger state itself b) having transactions be able to be settled asynchronously and in any order (while still being able to force order if needed if used together with smart-contracts); and c) being able to send multiple transactions to multiple end-users without compromising security of subsequent transactions.

It will also be appreciated that the account-based transaction system of [FIG. 2] removes the coupling between network states and transaction data itself and makes the result of settling it independent (highly-flexible) of the state. This solves the problem of not being able to accept or reject incoming payments from other end-users while being offline due to not knowing the latest state of the shared ledger inside the CBDC network and therefore enables offline transactions to be made securely and reliably.

Figure 3:
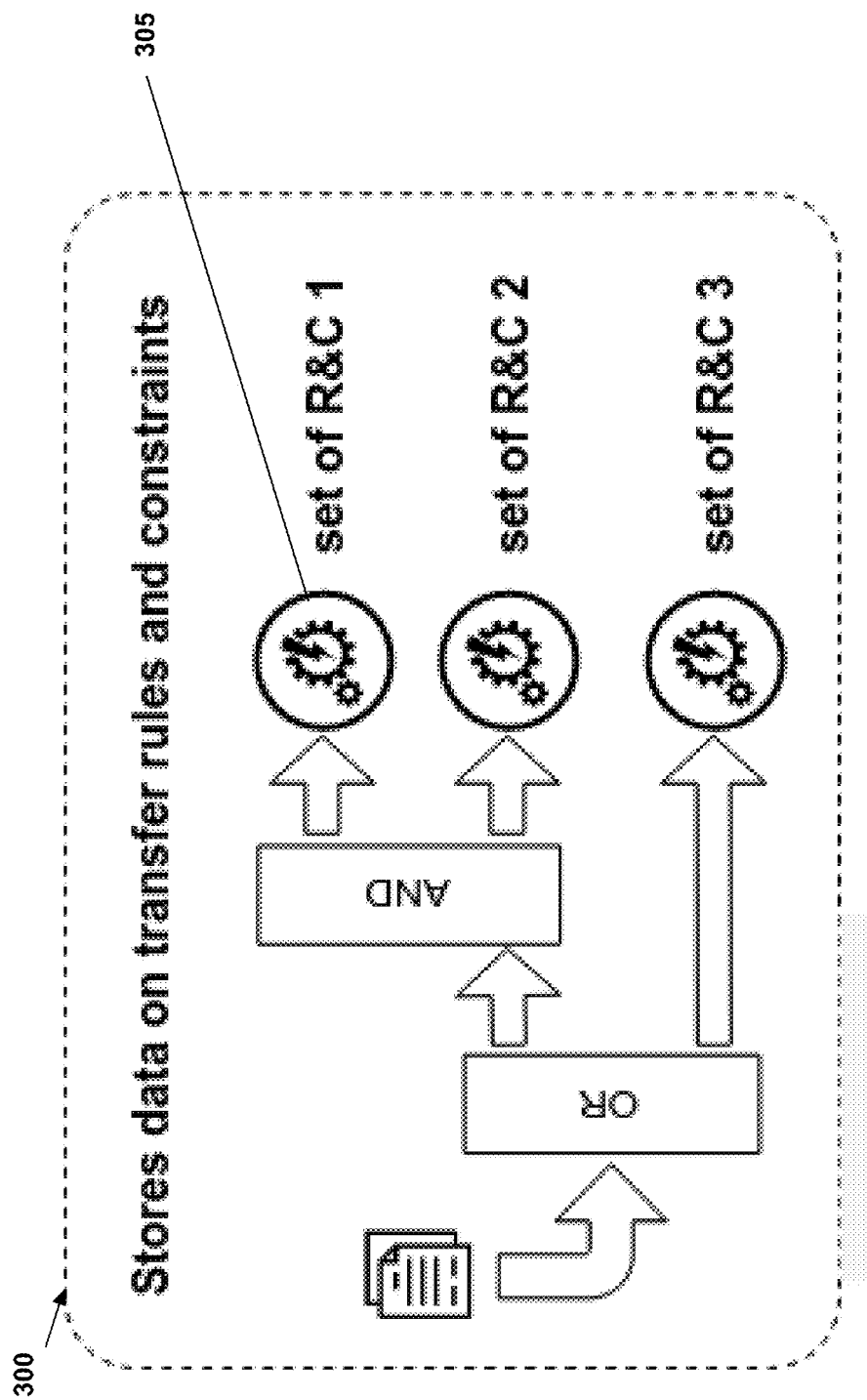
FIG. 3 is a schematic illustration of a smart contract usable by the node of [FIG. 1] to process an offline transaction according to an embodiment of the invention.

Referring now to [FIG. 3], a smart contract 300 suitable for use by node 100 to process an offline transaction is shown in schematic form. The smart contract capability provided by at least in part by smart contract 300 advantageously secures the on-chain part of the offline protocol.

Smart contract 300 can be implemented in any form suitable to the CBDC platform itself—e.g. an on-chain contract, an off-chain contract or an off-chain module with smart contract functionality. The smart contract functionality that smart contract 300 is part of enables the controlled transfer of assets between user accounts in such a way that it is possible to link user accounts of the same end-user to each other and also be able to automatically impose or resolve restrictions on them, forcing that end-user in question to always pay their debt. This can be used to ensure that offline transactions are always settled. In particular, the smart contract capability of the CBDC platform can be used to secure the on-chain part of the offline protocol, meaning to be able to settle transactions issued and/or received while being offline in a secure manner, that gives end-users a guarantee they will receive their "promised" funds.

Smart contract 300 can be referred to as a 'CBDC Authorization Contract'. Smart contract 300 holds a set of rules and constraints ('R&C') 305 that define how an asset transaction can be made in the CBDC network. In [FIG. 3] three sets of R&Cs are shown, but this is purely illustrative and it will be appreciated that any number of R&Cs can be present, including one.

There may be many different R&Cs supported, but in a preferred embodiment at least the following R&Cs are present:
1. R&Cs that link user accounts to each other in a way that if any given user account cannot settle a transaction, the transaction amount can be automatically deducted from a collateral account linked to the user account.
2. R&Cs that enable any given user account to be suspended such that the user account is unable to participate in further transactions until the suspension is removed.

The R&Cs of point 1 above makes it possible to create an inter-linked tree ('collateral chain') of collateral dependencies between user accounts in which if one user account cannot settle a transaction at a given time, a collateral user account will settle the transaction instead. The collateral chain of user accounts can be of any length and has the property that the next link in the chain can be called upon to fund a transaction that cannot be funded by a user account associated with the immediately preceding link in the collateral chain.

Figure 4:
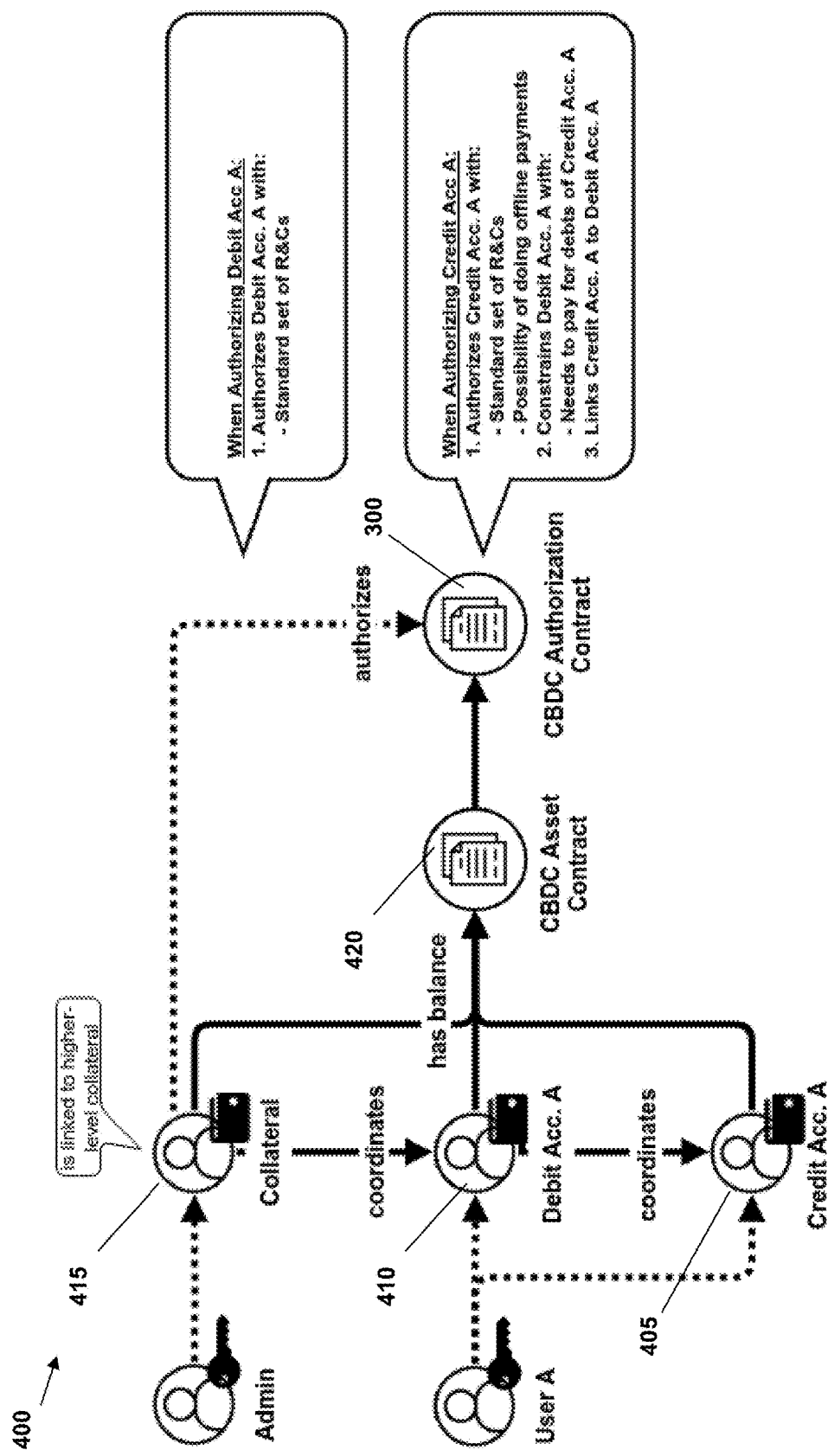
FIG. 4 is a schematic representation of a collateral chain constructed according to an embodiment of the invention.

A schematic representation of a collateral chain 400 in a CBDC network is shown in [FIG. 4]. A collateral chain may begin with several end-user accounts 405, 410 linked to each other, with later links in the chain falling back to user accounts 415 associated with organisations such as financial institutions or commercial banks. A collateral chain may be terminated by an asset issuer at the far end as the final link, on the understanding that this is a final fallback position which in practice should never be reached.

In the example of [FIG. 4] User A has two accounts 405, 410. Account 405 is authorised for offline transactions and account 410 is linked to account 405 such that account 410 can be automatically used to fund a transaction that account 405 is unable to fund. In the case where account 410 also cannot fund the transaction, the process advances along collateral chain 400 a further link to account 415 (e.g. an issuer user account) and uses this to fund the transaction. The link between different accounts is shown in [FIG. 4] using arrows labelled 'coordinates'.

The collateral chain is traversed during the settlement phase to ensure that even if the payor was unable to pay at the time of settlement, the collateral or collateral of collateral and so on pays instead. The collateral chain can go as far as to the network administrator itself, ensuring the payee of such a transaction the payment will be processed on all occasions. On the other hand, the onboarding process with real identities and metadata containing constraints attached to accounts, can ensure such a situation would be an exceptional situation in the CBDC network, and limited to a high degree.

The R&Cs of point 2 above make it possible to temporarily suspend, or at least limit the usability in some way, a user account that has been unable to fund a transaction until the debt owed to the collateral user account that funded the transaction on behalf of the user account is paid. A suspension can be placed on a user account by an account issuer or other such appropriate authority.

Also shown in [FIG. 4] is a smart contract 420 referred to as a 'CBDC Asset Contract'. This smart contract enables the basic functions of effecting transfers, e.g. identifying a payor user account and payee user account, an amount to transfer, etc. Such smart contracts per se are known in the art and therefore details of this smart contract are not provided here.

Figure 5:
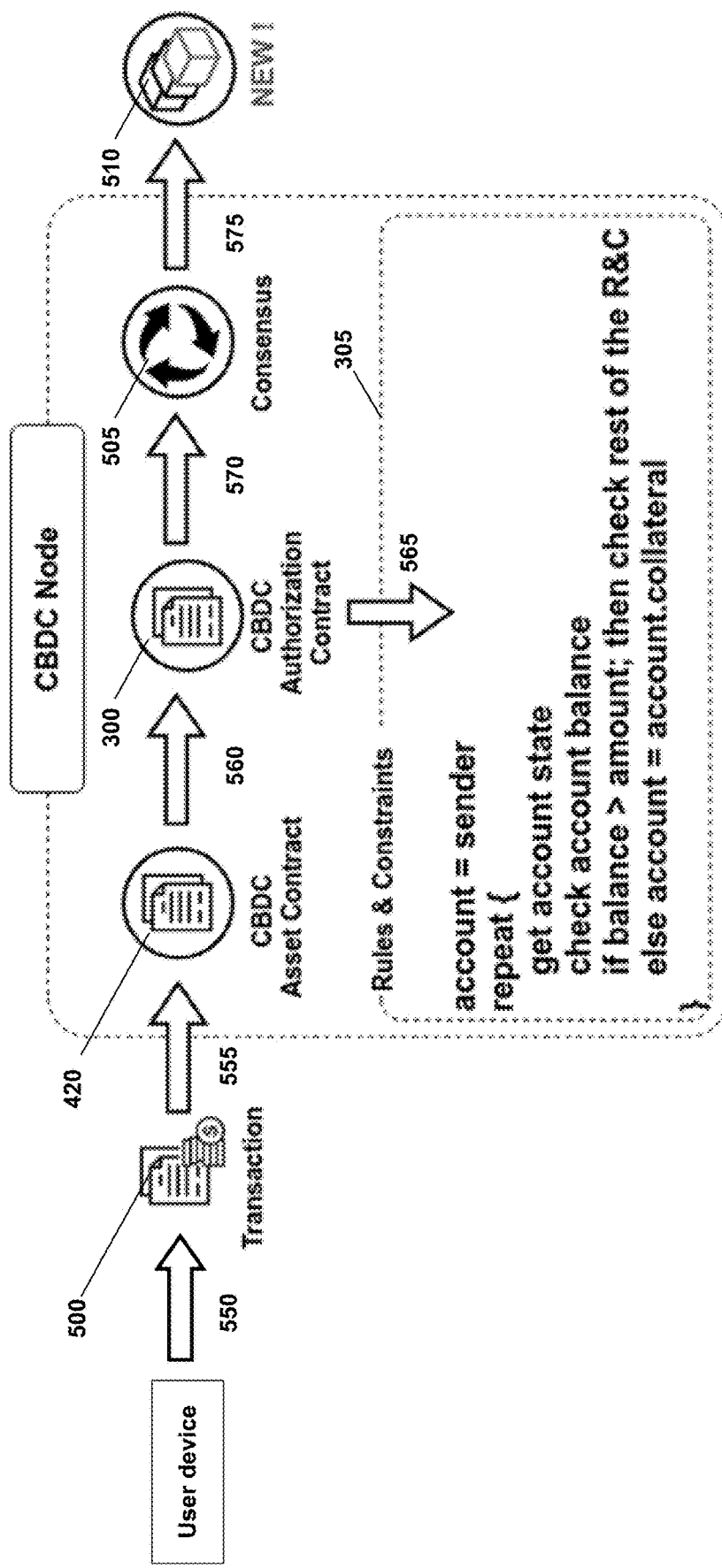
FIG. 5 is a schematic drawing of a process by which an offline transaction can be settled by a CBDC network according to an embodiment of the invention.

Referring now to [FIG. 5], a process is shown by which an offline transaction 500 can be settled by the CBDC network. In step 550 an unconfirmed transaction is received by a node of the CBDC network. The node could receive the unconfirmed transaction directly or the unconfirmed transaction could be received via an intermediate device such as a gateway. The transaction is unconfirmed because it has not been committed to the distributed ledger at this point, i.e. it is still 'pending'. The unconfirmed transaction can take the form of an electronic message or other such electronic data structure. The unconfirmed transaction can be received from a user device, where this user device has stored the offline transaction until an active connection to the CBDC network becomes available.

It is necessary for each node of the CBDC network that is participating in consensus to validate the offline transaction in order to commit it to the distributed ledger as a confirmed transaction. The recipient node therefore transmits the offline transaction 500 to all other nodes of the CBDC network participating in consensus. The validation itself can be performed by a virtual machine implemented by each participating node. This consensus and validation processes per se are well known in the art of distributed ledgers and therefore are not described in detail here, other than to highlight the novel parts of these processes as according to the invention.

In step 555 offline transaction 500 is processed by CBDC Asset Contract 420 by providing one or more transaction inputs from offline transaction 500 to CBDC Asset Contract 420. The transaction state change is computed using CBDC Asset Contract 420. It will be appreciated that CBDC Asset Contact 420 is serving as a mechanism for carrying out the 'normal' processing of a transaction in a CBDC network. A platform-specific counterpart to CBDC Asset Contract 420 can thus be used in its place.

In step 560 the transaction state change computed by CBDC Asset Contract 420 is provided as an input to CBDC Authorization Contract 300. The transaction state change is authorised in step 565 by CBDC Authorization Contract 300 by checking the transaction state change against a set of R&Cs 305 to ensure that the transaction state change meets the criteria set out by the R&Cs 305. If the transaction state change complies with the R&Cs 305 then transaction 500 is authorised, otherwise transaction 500 is declined. Here, 'authorisation' involves moving transaction 500 to a consensus validation phase 505 in step 570 that results in a new entry in the CBDC network distributed ledger 510 (step 575). Consensus validation and adding entries to a distributed ledger per se are both known in the art and so neither are described in detail here. Once consensus is complete, a receipt may be generated confirming that the transaction has been committed to the ledger. The receipt can be transmitted to the payer device and payor device.

As noted above, the R&Cs 300 can include essentially any rule or condition that is desirable given the particular implementation of the invention. However, it is considered advisable that at least the following R&Cs are defined:

R&C 1: If the payor account that initiated the offline transaction is able to fund the transaction using a CBDC asset that it holds, and no other constraints have been put on the payor account (e.g. account is not blocked), the transaction is authorised.

R&C 2: If the payor account that initiated the transaction is not able to fund the transaction using a CBDC asset that it holds, and no other constraints have been put on the payor account, the transaction authorisation process is repeated replacing the payor account with a collateral account instead—everything else is repeated recursively.

It will be appreciated that R&C2 can be repeated recursively a number of times until an account in the collateral chain is identified that holds a sufficient amount of a CBDC asset to fund the transaction. The CBDC Authorization Contract 300 is capable of identifying the next link in the collateral chain and thereby identifying the next account that payment should be attempted from.

The processing described above in connection with [FIG. 5] can be carried out by a virtual machine implemented by the node, e.g. virtual machine 105.

Figure 6:
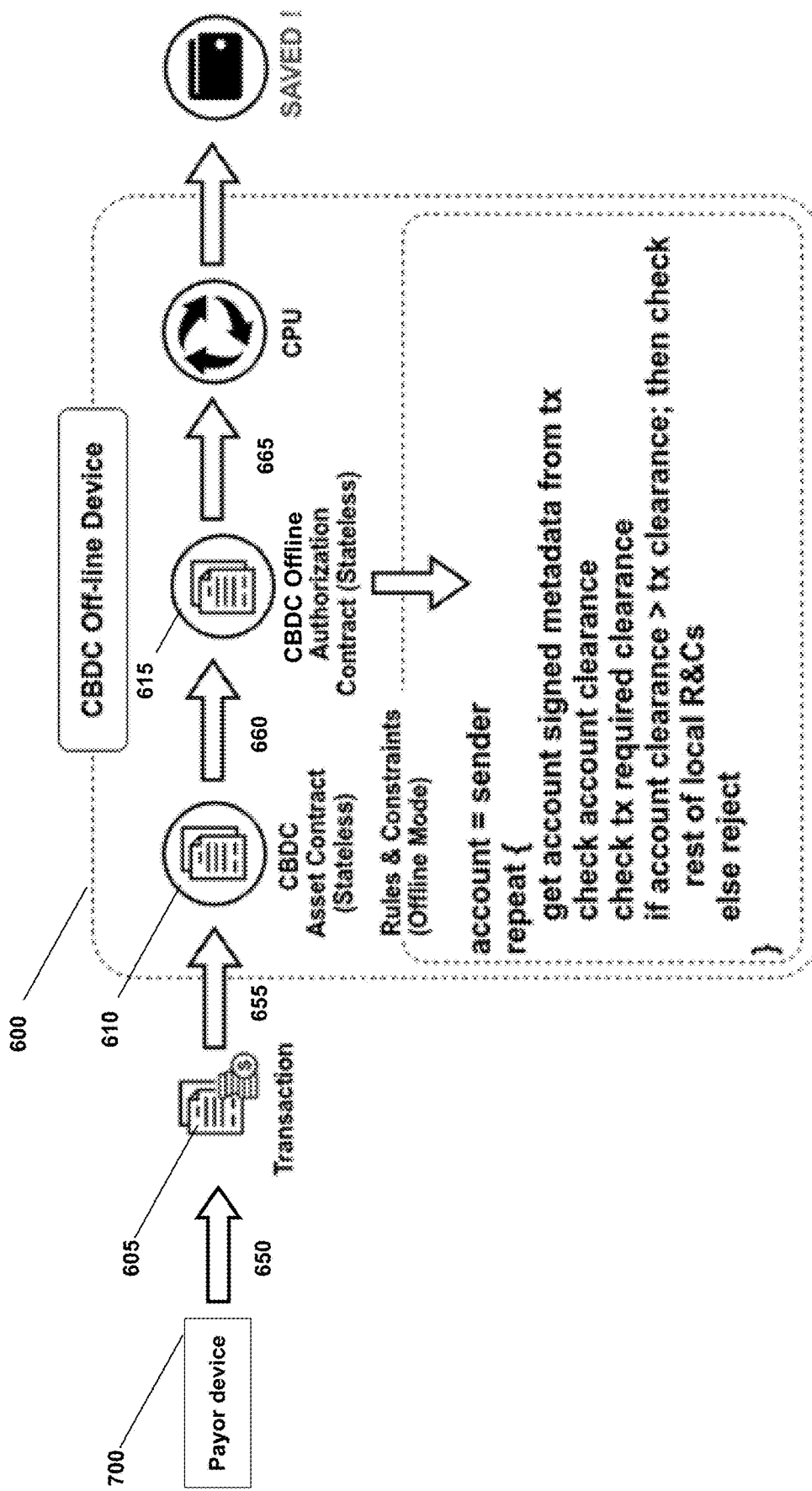
FIG. 6 is a schematic drawing of a process for receiving an offline transaction by a payee device, according to an embodiment of the invention.

Having described the CBDC network settlement process, reference is now made to [FIG. 6] in which a process for receiving offline transaction 500 by a payee device 600 ('CBDC Off-line Device') is shown in schematic form. It is understood that, at the time the process of [FIG. 6] is implemented, payee device 600 may be offline in that it does not have an active connection to the CBDC network. This does not preclude payee device 600 from communicating with other CBDC Off-line devices.

Figure 7:
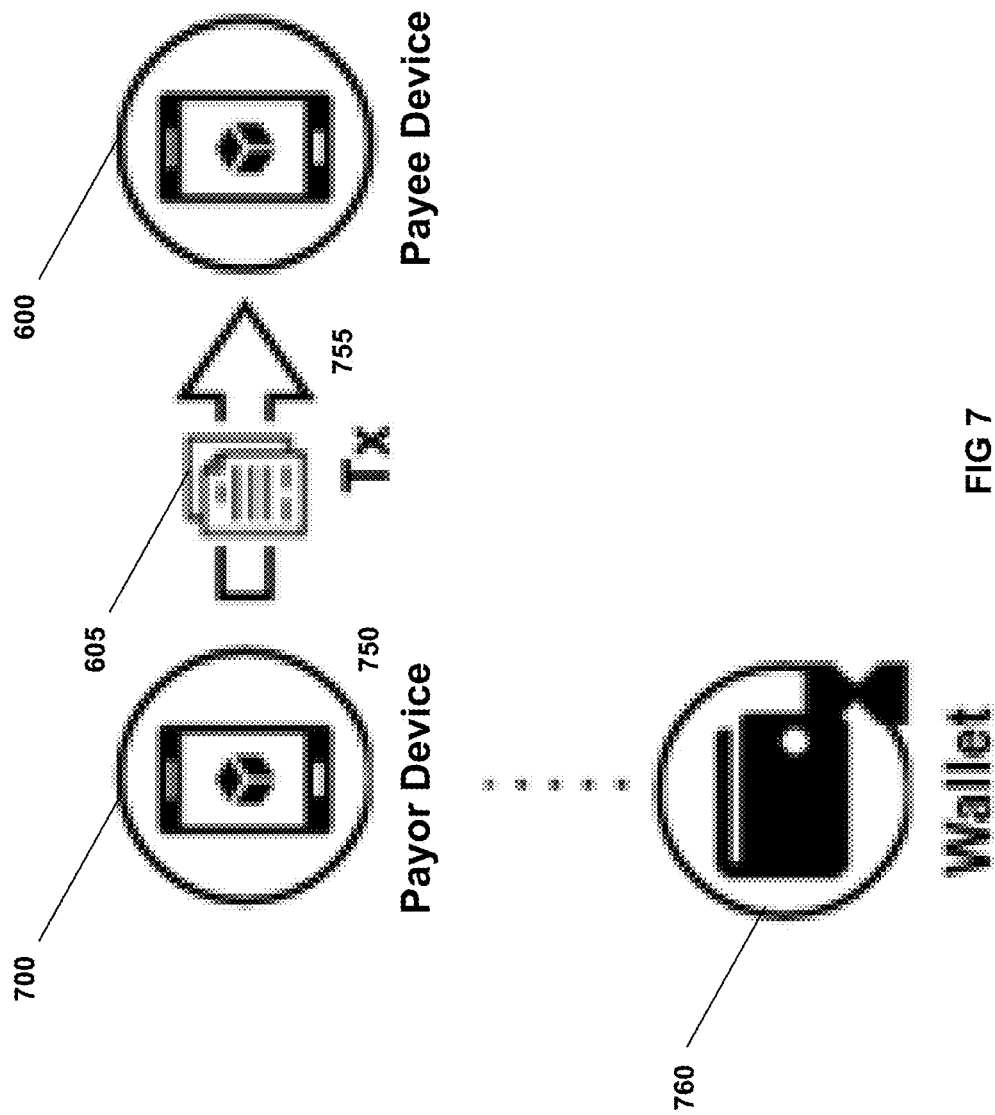
FIG. 7 is a schematic drawing of a process for generating an offline transaction by a payor device, according to an embodiment of the invention.

In step 650 payee device 600 receives offline transaction message 605 from a payor device (see also [FIG. 7]). The offline transaction message 605 comprises offline transaction details and metadata relating to the payor user account that is cryptographically signed by an issuer of the payor user account, the metadata including a payor account settlement level. The issuer is an entity that issued the account to the payor. In the case of a CBDC network, the issuer could be a commercial bank that performed Know Your Customer (KYC) checks on the payor and which onboarded the payor to the CBDC platform.

As part of step 650, payee device 600 calculates a transaction account settlement level based on the offline transaction details and/or the metadata. The transaction account settlement level indicates the level of authority that is required for the transaction to be authorised. The transaction account settlement level may be set based on transaction details such as transaction type, asset type, asset amount, and the like. The payor account settlement level indicates the maximum transaction level that the payor account is authorised to participate in. This may be set based on factors such as an identity of the payor, a payor transaction history, and the like. A risk score can be calculated for the payor account based on a previous offline transaction history of the payor account and the payor account settlement level can be set based on this risk score. The risk score can be updated periodically or on an ad-hoc basis to ensure that all historic behaviour of the payor is taken into account with the payor account settlement level.

The payor account settlement level is set by the issuer of the payor user account and is cryptographically signed by the issuer to enable the payee device to confirm that the metadata relating to the payor user account, e.g. the payor account settlement level, has not been altered by an unauthorised party. The transaction account settlement level and the payor account settlement level could be indicated by a numerical value, a string of characters, or some other computer-readable indicia.

The metadata can include any one or more of the following:
- a value indicating whether the payor is authorised to make offline transactions;
- a value specifying a maximum amount of an asset that the payor is authorised to transfer via the offline transaction;
- one or more values respectively specifying one or more types of asset that the payor is authorised to transfer via the offline transaction;
- information relating to an identity of the payor;
- information relating to an identity of the issuer; and/or
- an expiration date of the metadata This is not an exhaustive list and any other information deemed desirable by the skilled person given the specifics of a particular implementation of the invention can alternatively or additionally be included in the transaction metadata. These additional items of data can be used in R&C checks, for example.

In step 655 payee device 600 checks the offline transaction details included in offline transaction 605. The checking can be performed by CBDC Asset Contract 610 which performs the same or similar functions to CBDC Asset 420. The checks can include any combination of: checking the transaction encoding of offline transaction 605, checking the transaction integrity of offline transaction 605 and checking that offline transaction 605 is compliant with local rules and constraints.

In step 660 payee device 600 checks whether the offline transaction associated with offline transaction message 605 can be authorised. This check is performed by CBDC Offline Authorization Smart Contract 615. The check involves payee device 600 determining whether the payee device clearance level, as extracted from the metadata of offline transaction message 605, is greater than or equal to the transaction account settlement level calculated based on details of offline transaction message 605. If the payor account settlement level is greater than or equal to the transaction account settlement level then offline transaction message 605 can be processed. If the payor account settlement level is less than the transaction account settlement level then the transaction cannot be processed, and in this case payee device 600 rejects the transaction. It will also be appreciated that if the digital signature associated with the metadata is invalid, payee device 600 will reject the transaction as this could indicate an attempt to make a fraudulent transaction.

Processing of offline transaction message 605 can include checking that offline transaction message 605 is compliant with any other R&Cs that may be part of CBDC Offline Authorization Smart Contract 615. In the case where offline transaction message 605 is compliant with all checks, it may be automatically accepted by payee device 600 or a prompt for manual acceptance by the payee may be generated. The prompt could be, for example, a request on a display of payee device 600 for the payee to enter some input indicating approval or disapproval of the transaction.

In the case where the offline transaction passes all necessary checks, in step 665 payee device 600 accepts the transaction and stores offline transaction message 605. Offline transaction message 605 can be stored in a local storage, e.g. a memory of payee device 600. A confirmation message may be sent by payee device 600 to payor device 700 indicating that the offline transaction has been accepted.

Payee device 600 can be configured to check for an active connection to the CBDC network on a periodic or ad-hoc basis. When an active connection with the CBDC network is found by payee device 600, payee device 600 can upload to the CBDC network all offline transaction messages that have been stored by payee device 600, i.e. the stored copy of offline transaction message 605 and any other stored offline transaction messages. The CBDC network can process the uploaded message(s) according to the process shown in [FIG. 5].

The process of [FIG. 6] can be carried out by a software application installed on payee device 600. The software application may be a wallet application. References to a 'wallet' herein are to be understood as referring to a digital wallet of the type managed by a wallet application. Offline transaction messages may be referred to as being 'stored in the wallet', meaning that the wallet application has access to the offline transaction messages and can perform operations involving these offline transaction messages such as the operations of [FIG. 6].

Payee device 600 may adjust a balance of the payee user account based on an amount of a CBDC asset transferred as specified in offline transaction message 605. The adjustment may be made in a wallet of payee device 600 as managed by a wallet application. The adjustment may be performed after acceptance of the transaction (step 655).

FIG. 7 shows a process carried out by payor device 700 to generate an offline transaction. The process of [FIG. 7] complements that of [FIG. 6] as [FIG. 7] shows the process by which offline transaction message 605 can be generated. In step 750 payor device 700 generates offline transaction message 605. As mentioned earlier, offline transaction message 605 comprises offline transaction details and metadata relating to the payor user account that is cryptographically signed by an issuer of the payor user account. The metadata includes the payor account settlement level discussed above.

In step 705 payor device 700 transmits offline transaction message 605 to the payee device 600. The transmission can take place over any communication channel between payor device 705 and payee device 600, e.g. a Bluetooth®, WiFi, NFC, an infra-red channel and the like. An optical channel can also be used where an image such as a QR code is displayed on a display of payor device 700, imaged by a camera of payee device 600 and processed by software on payee device 600 to extract information from the image. Other suitable channels for transmitting offline transaction message 605 to payee device 600 will be apparent to a skilled person.

Upon reception of offline transaction message 605, payee device 600 can process this message according to the process of [FIG. 6].

It will be appreciated that the process of [FIG. 6] is performed immediately following the process of [FIG. 7]. At the time these two processes are performed, it is the case that one or both of payee device 600 and payor device 700 does not have an active connection to the CBDC network.

Payor device 705 may adjust a balance of the payor user account based on an amount of a CBDC asset transferred as specified in offline transaction message 605. The adjustment may be made in a wallet 760 of payor device 705 as managed by a wallet application. The adjustment may be performed after receiving a confirmation from payee device 600 that the offline transaction has been accepted by payee device 600.

Payor device 700 may store the offline transaction message 605 in a local repository. Payee device 700 can be configured to check for an active connection to the CBDC network on a periodic or ad-hoc basis. When an active connection with the CBDC network is found by payor device 700, payor device 700 can upload to the CBDC network all offline transaction messages that have been stored by payor device 700, i.e. the stored copy of offline transaction message 605 and any other stored offline transaction messages. The CBDC network can process the uploaded message(s) according to the process shown in [FIG. 5].

When handling offline transactions a situation may arise in which a request for cancellation is made. For example in a case when an offline transaction was already sent from payor to payee, and then one party to the transaction subsequently wants to cancel it. In such a situation a solution may appear to be erasing the data associated with that transaction on both ends so the transaction cannot be settled later. This is however not enough in the case of an offline transaction, as there is no way to safely prove the data was erased in the first place by both payee device 600 and payor device 700. One or both of the parties may claim they erased the data, but then the payor later finds that the payee nevertheless attempted to settle the transaction. The data being erased may be, or comprise, the stored offline transaction transaction message 605.

To make sure there are no problems like this, the invention provides a novel cancellation process that is made as a two-step process. The first step during cancellation is to erase the transaction data as described in the immediately preceding paragraph. The second step to ensure safety is to issue a cancellation transaction that—in case of settlement of the original transaction that is being cancelled—negates the original transaction in the CBDC network, or blocks it from being settled, to cause the CBDC asset that is the subject of the original transaction to revert to their original pre-transaction state.

This technique advantageously means that, in the case of a bad actor (e.g. a payee not actually erasing the first transaction and trying to settle it), the payor is able to revert the transfer of assets made by the original transaction by sending a cancellation transaction afterwards.

In the case where the cancellation transaction is settled by the CBDC network before the original transaction that it cancels, the cancellation transaction has the effect of blocking the original transaction from being settled by the CBDC network (settling would be rejected).

The cancellation of a transaction can be constructed only by cooperation of both parties (payor and payee), so there is no possibility for the payor to cancel the transaction unilaterally—i.e. this system does not decrease the trust in offline protocol at all.

Figure 8:
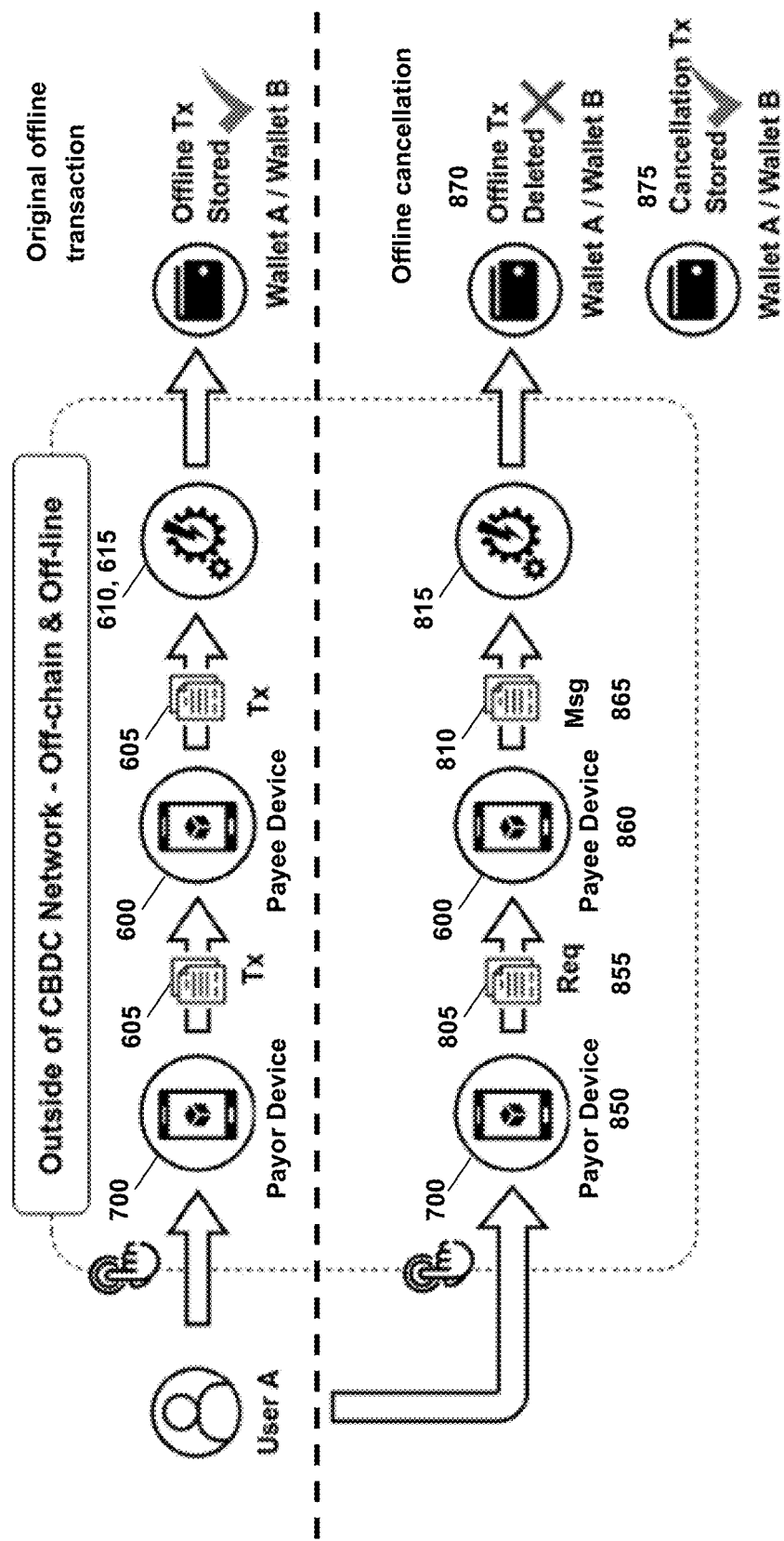
FIG. 8 is a schematic drawing of a process for cancelling an offline transaction, according to an embodiment of the invention.

A process for cancelling an offline transaction according to the invention is shown in [FIG. 8]. It is important to note that this cancellation process can be performed offline, i.e. when one or both of payee device 600 and payor device 700 do not have an active connection to the CBDC network.

FIG. 8 is split into two parts by a horizontal dashed line. The upper part, labelled 'original offline transaction', is the process followed to generate the original offline transaction that is to be cancelled. This is described above in connection with [FIG. 6] and [FIG. 7]. The main focus of this part of the specification is the offline cancellation process shown in the lower part of [FIG. 8].

The process initiates with the payor deciding to cancel the original offline transaction. In step 850 payor device 700 generates an offline transaction cancellation request message 805 and in step 855 payor device 700 transmits the offline transaction cancellation request message 805 to payee device 600. The offline transaction cancellation request message 805 can be sent over a communication channel between the payor and payee devices. This may be a local communication channel of the type referred to earlier.

In step 860 payee device 600 receives the offline transaction cancellation request message 805 from payor device 700 and in step 865 payee device 600 generates an offline cancellation transaction message 810. The offline transaction cancellation message 810 can be similar to offline transaction message 605, but effecting a cancellation rather than an asset transfer.

Offline transaction cancellation message 810 may be checked against R&Cs 815 stored locally by payee device 600. R&Cs 815 can define any rules and/or conditions that are considered appropriate by the skilled person, e.g. checking that an original transaction corresponding to the offline cancellation transaction message exists.

In step 870 payee device 600 deletes the original offline transaction message that relates to the transaction that is being cancelled by offline transaction cancellation message 810 and in step 875 payee device 600 stores offline transaction cancellation message 810, e.g. in a local memory of payee device 600. Payee device 600 can then also transmit offline transaction cancellation message 810 to payor device 700 for storage by payor device 700. Offline transaction cancellation message 810 is then accessible by both payor device 700 and payee device 600 and can be transmitted to the CBDC network if necessary to overwrite the original transaction. A balance of a wallet available on payee device 600 and/or payor device 700 may be updated to reflect the cancellation of the original transaction.

It will be appreciated that the roles of payor device 700 and payee device 600 can be switched in the process of [FIG. 8] to enable the payee to initiate cancellation of an offline transaction.

An advantage of the cancellation technique of the invention is that there is no inherent requirement on how to model transactions in such a way the system is able to handle creation of transaction cancellations. The implementation detail can vary between CBDC systems. It is preferred to use the commonly known Command pattern as the underlying pattern in which smart contracts are implemented to achieve this easily, but this is not essential to the working of the invention and other equivalent solutions are useable as well.

Figure 9:
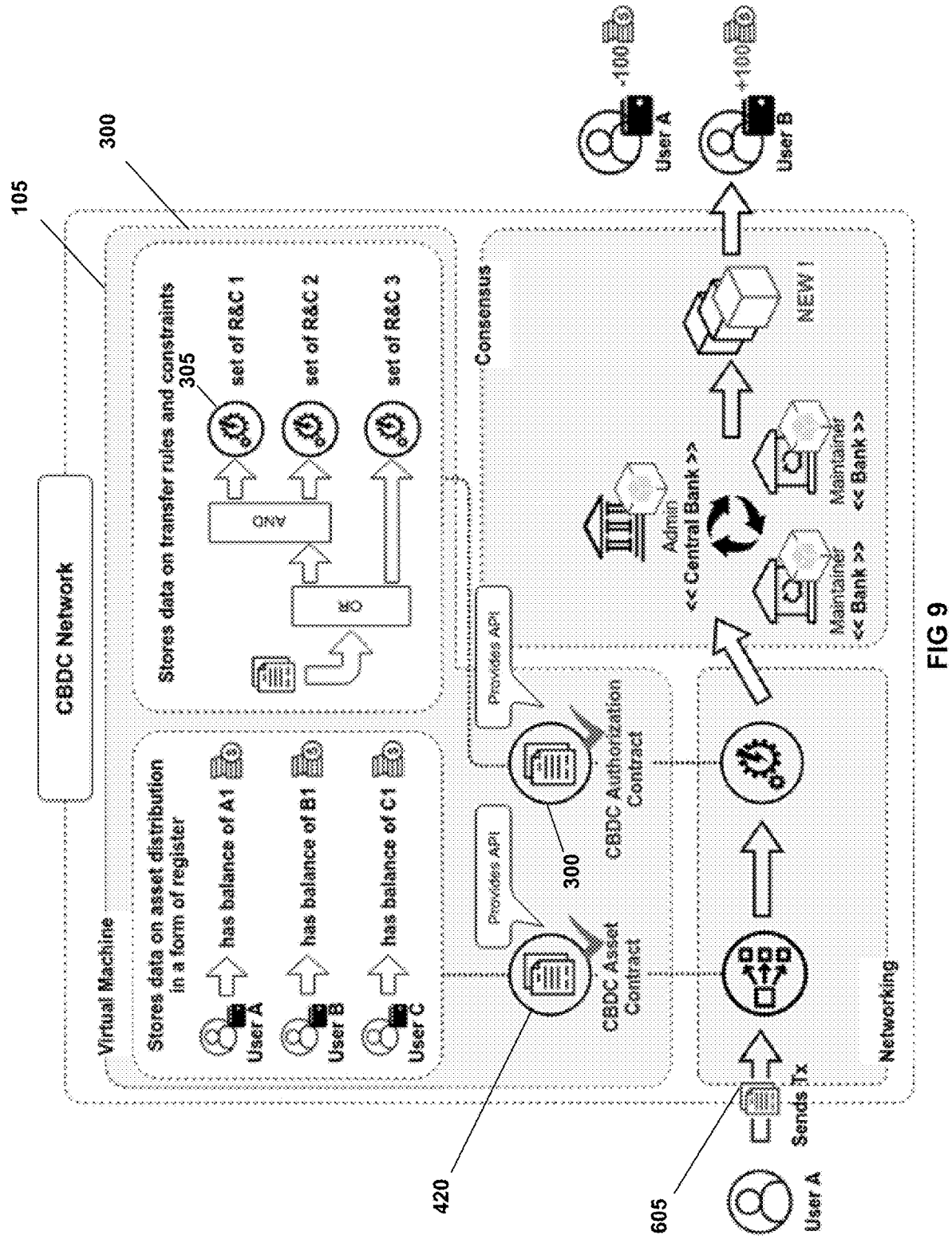
FIG. 9 shows an overview of all of the elements of a CBDC network according to an embodiment of the invention.

Having described all of the various elements of the CBDC platform according to the invention, reference is made to [FIG. 9] which shows in overview all of the various elements of the CBDC network. As can be seen from this figure, settlement of an offline transaction is first triggered by user A (e.g. via payee device 600 or payor device 700). The offline transaction message 605 is sent to the CBDC network (e.g. via the gateway nearest to User A's device)—this is after Users A and B (e.g. payor and payee) are able to observe the transfer of funds taking place, this having occurred in the offline process. The process of generating a transaction state change and committing this to the CBDC network can then take place (see [FIG. 5]) such that the offline transaction is converted to an online transaction and settled. The whole process is carried out by devices such as payee device 600 and payor device 700 which can communicate with CBDC nodes (possibly via a gateway) during times where a communication channel is available, are able to understand all communication protocols as described herein used to "talk" to CBDC nodes. Such devices are also able to securely store private keys and partially signed transactions—i.e. be able to function as digital wallets. More information is provided on this in the next part of this specification. There are no special requirements on devices implementing the invention other than these. Devices capable of implementing the invention may be delivered in a form of specialized hardware (e.g. payment processor hardware) or general-use hardware with addition of specialized software being installed on it (e.g. mobile phone with software application(s)).

Figure 10:
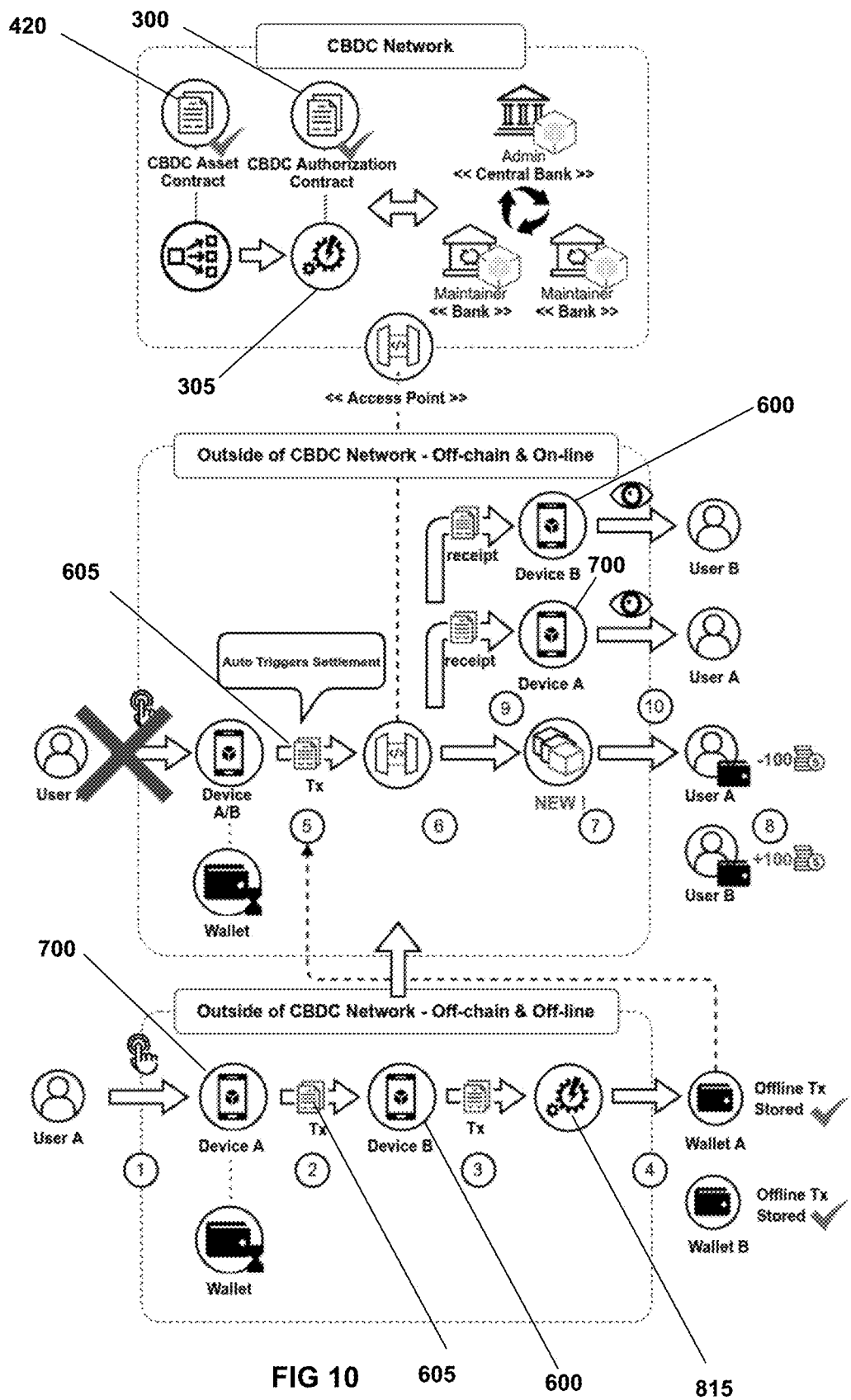
FIG. 10 is a schematic drawing providing an overview of offline transactions according to an embodiment of the invention.

FIG. 10 provides a schematic overview of offline transactions according to the invention. This figure incorporates elements described above as shown by the numbering on [FIG. 10]. [FIG. 10] depicts User A (payor) making a payment to User B (payee) according to the invention as described above. At the time of making the payment, one or both of the devices used by User A and User B are offline, i.e. they do not have an active connection to the CBDC network. This process can be summarised as follows, with the numbering here referring to the numbers shown in circles on [FIG. 10]:

1. User A triggers payment by using Device A (payor device), e.g. by interacting with a software application installed on Device A.
2. Device A sends an offline transaction to recipient Device B (payee device) using a local (peer-to-peer) channel.
3. Device B processes the offline transaction locally.
4. Device A stores a copy of the offline transaction; Device B stores a copy of the offline transaction.
5. Either Device A or Device B detects that it has an active connection to the CBDC network and transmits the locally saved offline transaction to the nearest gateway to settle it online.
6. Gateway sends transaction to the CBDC network to be processed by (nodes of) the CBDC network.
7. Gateway observes transaction being confirmed by CBDC network and added to a shared ledger.
8. Amount of funds in possession of user A is decreased; Amount of funds in possession of user B is increased.
9. Transaction receipt is sent from gateway to Device A and Device B.
10. The CBDC network records a decrease in User A's funds and a corresponding increase in User B's funds.

The processes of the invention advantageously enable one or more of the following:

a) As soon as an offline transaction is completed by Device A and Device B, it is assumed the transaction has been made. Both devices store the offline transaction message for eventual settlement by the CBDC network and show decreased/increased balances for users A and B, respectively, with the knowledge that the transaction will be confirmed by the CBDC network in the future such that the balances shown by Devices A and B will match the balance held for these user accounts by the CBDC network.

b) As soon as either Device A or Device B detects that it has an active connection to the CBDC network, the device broadcasts locally stored transaction(s) to the network to 'make them official' (i.e. committed to the distributed ledger).

c) The offline protocol of the invention does not impose any requirements on settlement order meaning that transactions can be settled immediately when being online without further restrictions.

d) The offline protocol naturally makes chaining of offline transactions possible. It is also possible to issue multiple offline transactions without making them codependent on each other and it is further possible to re-send offline transactions.

Using Nonceless Cryptography for Implementing Off-Chain Part of the Offline Protocol Because of the decentralized nature of DLT-based networks, including CBDCs, it is advantageous to define specific protocols to be used to encode and decode transactions broadcasted to the network, usually called 'transaction envelopes'. Those protocols define how transactions should be constructed, what kind of cryptographic functions should be used in order to sign transactions, and what kind of contextual data needs to be saved. Existing protocols frequently contain data that restricts transaction liveliness (indirectly) to short and sometimes nondeterministic periods and because of that they are not sufficient to be used for offline protocols that require long, deterministic liveliness of transactions being processed.

It is desirable to be able to apply the invention to any arbitrarily configured decentralized CBDC. The inventors thus recognised that the invention preferably does not rely on some particular implementation of the transaction envelope. This is because the offline protocol described above functions best in cases where long, deterministic liveliness of transactions is achieved.

It is thus desirable to create a separate, special encoding and decoding mechanism for offline protocol. Offline transactions themselves are defined as transactions that are being passed offline and possible to be transformed to their online counterparts for the purpose of settling on the ledger. Complications can arise when considering how to transform an offline transaction into an online transaction in view of the fact that some of the data needed for creating a transaction is suitable to be filled during transaction creation (i.e. in the offline phase) and some other parts of the data are instead fillable later (i.e. in the online phase). Here, 'fillable' refers to the addition of data to a field in a transaction message.

Prior art solutions would require the existence of some sort of bridge that is able to decrypt an offline envelope, understand its data, then use that data and polyfill to re-encrypt and generate an online transactions. While this is possible, this approach requires that the entity performing these actions (the 'proxy') has access to the private key that is usable to decrypt the offline envelope. This is undesirable in a DLT network as optimally only the original signer should have access to that key.

Accordingly, in an embodiment the invention makes use of a novel cryptographic technique referred to herein as 'nonceless cryptography' for the purpose of handling offline encoding and decoding of the offline transaction message 605. Nonceless cryptography uses a mix of additive and reductable cryptography.

Additive cryptographic functions are understood as those able to expand the content of cryptographically signed data by adding new information to it in controlled manner in a way that signed data after that addition is still properly signed (the original signature is preserved), but at no point of time original secret key was exposed to any party. Instead that data is being added by a specially created meta-function that has this additive property built encoded in.

Reducatable cryptography functions are the opposite of additive functions, as instead of adding information to the signed data, a reductable function is able to remove information from it whilst preserving the original cryptographic signature.

Examples of additive and reductable cryptographic functions include homomorphic encryption functions.

Nonceless cryptography, because of the way it is implemented, allows creation of:
a) A partially-signed transaction message that has filled information required during creation of the transaction (e.g. any one or more of a payee account identifier, a payee identity, an asset type, an asset amount, a time-to-live, double-spend protection, etc.).
b) Signed additive/reductable cryptographic function(s) called 'meta-functions' herein that is/are operable to attach predefined data on top of a partially-signed transaction message in order to securely attach data needed to be known before settlement but not available when the transaction is created.
c) A finalization cryptographic function or 'master meta-function' that takes the previously mentioned parts of the offline envelope of an offline transaction and transforms it to an online transaction containing all necessary data to enable settlement.

Figure 11:
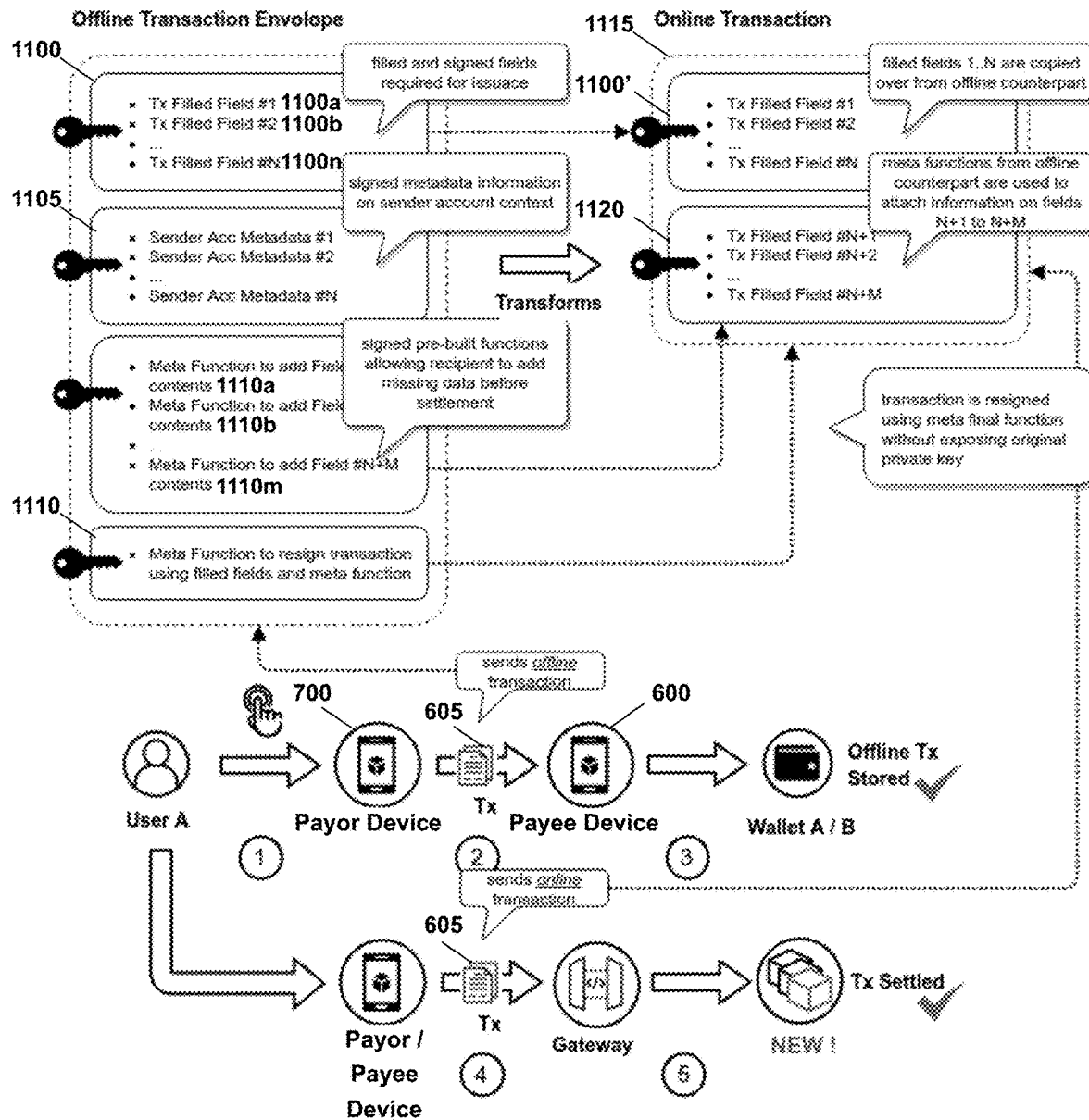
FIG. 11 is a schematic drawing illustrating a process for creating a nonceless transaction according to an embodiment of the invention.

Referring to [FIG. 11], a process is described for creating a nonceless transaction according to an embodiment of the invention. To assist in the understanding of how nonceless cryptography can be implemented with the offline protocol aspect of the invention described above, [FIG. 11] includes at the bottom an brief overview of the offline protocol. The numbers in circles correspond to those of [FIG. 10].

Nonceless cryptography allows the creation of addition/reduction meta-functions that are constrained to specific fields and specific ranges of values. It does not allow modification of the transaction outside of those constraints, and the created addition/reduction functions do not expose the private key used to sign the meta-functions in the first place, so they are safe to be shared alongside a partially-signed transaction.

As is shown in [FIG. 11], the transaction signer (e.g. payor device 700), while creating an offline transaction, prepares the following items. In [FIG. 11], an image of a key indicates application of a digital signature.

i. A partially-signed transaction message referred to as an offline portion 1100 comprising one or more translation filled fields 1100a, 1100b, 1100n. These fields are filled with data available at the time the transaction is created. N can take any positive integer value. Offline portion 1100 is digitally signed using a cryptographic signing algorithm by payor device 700. This enables any tampering with fields 1100a, 1100b, 1100n to be identified. The signature can be applied using a secret key known only to payor device 700. Techniques for generating digital signatures per se are known in the art and any such techniques, or future developed techniques, can be used.

ii. A meta-function portion 1105 comprising one or more meta-functions 1105a, 1105b, 1105m. Each meta-function is an additive or reductive cryptographic function, or a mixture of additive and reductive cryptographic functions. M can take any positive integer value. Meta-function portion 1105 is digitally signed using a cryptographic signing algorithm by payor device 700, preferably using the same key as for signing offline portion 1100. This enables any tampering with fields 1105a, 1105b, . . . , 1105n to be identified.

iii. A master meta-function portion 1110 comprising a master meta function that is usable to re-sign the transaction message using the meta-functions such that the signature applied to offline portion 1100 is preserved. The master meta-function applies the meta-functions stored in meta-function portion 1105 in such a manner that it is possible to add or remove data in limited and specific ways whilst retaining the validity of the digital signature applied to offline portion 1100. In this way an online transaction message 1115 can be generated based on the offline transaction message 605 but with additional data provided such that online transaction message 1115 can be correctly processed by the CBDC network, whilst maintaining the validity of the digital signature applied to offline portion 1100'. Master meta-function portion 1115 is digitally signed using a cryptographic signing algorithm by payor device 700, preferably using the same key as for signing offline portion 1100 and meta-function portion 1105. This enables any tampering with the master meta-function to be identified. The master meta-function can be a homomorphic cryptographic function.

Metadata 1120 as discussed earlier in this specification is also present in the offline transaction envelope, but this does not play a role in the nonceless cryptographic techniques of the invention.

Offline portion 1100, meta-function portion 1105 and master meta-function portion 1110 are all included in the offline transaction envelope as shown in [FIG. 11]. This is sent to payee device 600 as offline transaction message 605.

As shown in [FIG. 11], online transaction message 1115 comprises two portions. The first portion is a copy of offline portion 1110, and has been denoted 1110' in [FIG. 11] to indicate this relationship. The second portion, labelled 1120, represents changes that have been made to offline portion 1110' using the meta-functions as directed by the master meta-function. The changes can be additive and/or reductive. These changes are made to transform offline portion 1110 into an online transaction message 1115 that is processable by the CBDC network and also associated with the payor in a non-repudiable manner via the preserved digital signature.

Payee device 600, after accepting such a transaction as discussed in connection with [FIG. 5] can then store the offline transaction message 605 locally. At some point, when payee device 600 comes back online (i.e. has an active connection to the CBDC network), transaction message 605 can be sent to the CBDC network, e.g. via a proxy/gateway. The proxy/gateway, being an online component of the CBDC network, can use the meta-functions contained in meta-function portion 1105 and attach the missing state information onto offline portion 1100' by using the master meta-function stored in master meta-function portion 1110. The result is an online transaction message 1115 that is still validly signed, i.e. the digital signature applied to the offline portion 1100' by the master meta-function is both identical to the digital signature applied to offline portion 1100 of the offline transaction message and valid when tested against the online transaction message 1115.

It will be appreciated that the invention described herein and aspects thereof can be implemented using one or more computers having at least the components described in connection with the figures. The invention can be implemented by such computers performing operations as defined in computer-readable instructions. Said instructions may be stored on a computer-readable medium, and said computer-readable medium may be a non-tangible computer-readable medium. A set of computer-readable instructions stored on such a medium also falls within the scope of the invention.

It will be appreciated that the invention is susceptible to many modifications, alterations and adjustments. Embodiments arising from any such modifications are within the scope of the invention which is defined by the appended claims.

The invention claimed is:

1. A computer-implemented method for authorising an offline transaction made via a distributed Central Bank Digital Currency, CBDC, network between a payor device having a processor and memory capable of running a computer application and a payee device having a processor and memory capable of running a computer application,
   wherein at least one of the payor device and the payee device did not have an active connection to the CBDC network at the time the offline transaction was performed, wherein the CBDC network is an account-based CBDC network in which each user of the network has an associated user account, the payor device and the payee device being respectively associated with a payor user account and a payee user account,
   the method comprising:
   a) receiving, by a node of the CBDC network having a processor and memory capable of running a computer application, an offline transaction message relating to the offline transaction;
   b) processing, by the node, the offline transaction message using an asset smart contract of the CBDC network to calculate a transaction state change;
   c) authorising, by the node, the transaction state change using an authorisation smart contract of the CBDC network, the authorising comprising:
   determining whether the payor user account holds a sufficient amount of a Central Bank Digital Currency, CBDC, asset to fund the transaction;
   in the case where the payor user account does hold a sufficient amount of the CBDC asset to fund the transaction, authorising the transaction;
   in the case where the payor user account does not hold a sufficient amount of the CBDC asset to fund the transaction, identifying, using the authorisation smart contract, a collateral user account in a collateral chain provided by the CBDC network, that is linked to the payor user account such that a transaction specifying the payor user account as payor can be funded using a CBDC asset supplied from the collateral user account in the case where the payor user account is unable to fund the transaction;
   repeating steps b) and c) using the collateral user account in place of the payor user account;
   wherein the offline transaction message includes: an offline portion having one or more offline fields each holding offline transaction data, a first digital signature associated with the offline portion, a meta-function portion having one or more meta-function fields each holding a meta-function, a second digital signature associated with the meta-function portion, and a master meta-function portion having a master meta-function field holding a master meta-function, and a third digital signature associated with the master meta-function portion;
   and wherein step b) further comprises:
   generating, by the node, a transaction message by:
   providing a blank transaction message;
   copying the offline portion of the offline message to the transaction message;
   operating on the transaction message using each of the one or more meta-functions in turn, each meta-function to append data to the offline portion, or removed data from the offline portion, to produce an online transaction message; and
   using the master meta-function to apply a digital signature to the online transaction message, the applied digital signature matching the first digital signature.

2. The computer-implemented method of claim 1, further comprising:
   d) determining that the collateral user account does not hold a sufficient amount of the CBDC asset to settle the transaction;
   e) identifying, using the authorisation smart contract, a secondary collateral user account that is linked to the collateral user account such that a transaction specifying the collateral user account as payor can be funded using a CBDC asset supplied from the secondary collateral user account in the case where the collateral user account is unable to fund the transaction; and repeating steps b) and c) using the secondary collateral user account in place of the collateral user account.

3. The computer-implement method of claim 2, wherein steps d) and e) are repeated for each of a series of user accounts in a collateral user account chain until a user account holding a sufficient amount of a CBDC asset to fund the transaction is identified, the payor account, collateral user account and secondary collateral user account being part of the user account chain.

* * * * *